UNITED STATES PATENT OFFICE.

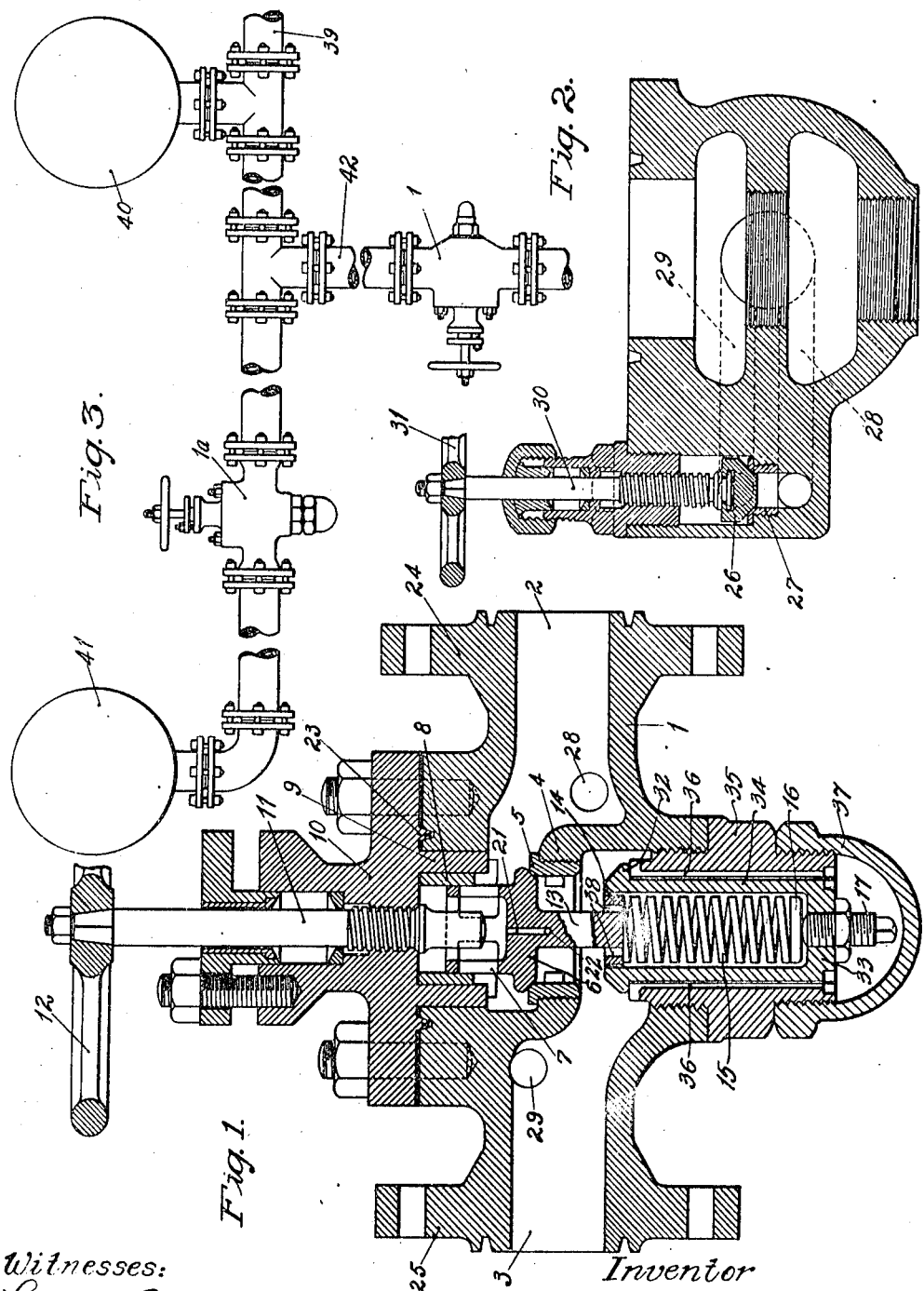

OLAF E. OLESON, OF CHICAGO, ILLINOIS, ASSIGNOR TO THE EDWARD STEAM SPECIALTY CO., OF CHICAGO, ILLINOIS, A CORPORATION OF ILLINOIS.

AUTOMATIC PRESSURE-LIMITING VALVE.

1,228,593.  Specification of Letters Patent.  Patented June 5, 1917.

Application filed January 2, 1913. Serial No. 739,696.

*To all whom it may concern:*

Be it known that I, OLAF E. OLESON, a citizen of the United States, residing at Chicago, in the county of Cook and State of Illinois, have invented a certain new and useful Improvement in Automatic Pressure-Limiting Valves, of which the following is a full, clear, concise, and exact description, reference being had to the accompanying drawings, forming a part of this specification.

My invention relates to an improved construction of pressure limiting valve by which when for any reason the difference in pressure between the supply and delivery ends of the valve reaches a predetermined amount, the valve is automatically moved to its seat to prevent the escape of the fluid, the flow of which is controlled by the valve. A further object of my invention is to provide in connection with a structure of the kind referred to a stop mechanism which will positively hold the valve against its seat.

A further object of my invention is to provide a valve construction of the kind referred to which will automatically operate to stop the flow of fluid through the valve for a drop in pressure at either end of the valve a predetermined amount below the pressure at the other end of the valve. It is a further object of my invention to provide in connection with valves of the kind just referred to, auxiliary valve mechanism by which the pressures at the two ends of the pressure limiting valve may be equalized to permit the automatic valve mechanism to return to its normal open position.

While valves of the kind described may be employed for many purposes, as for example, the handling of gas of any description, steam under high pressure, or compressed air, they are of particular value in connection with the use of compressed air as the motive power in mines where long lines of pipe are run between successive storage reservoirs for the purpose of containing air under high pressures. As a result of the grade of labor employed, accidents easily occur to these pipe systems and it is necessary to provide valves in the pipes which will normally not interfere with the flow of the air through them but as soon as there is a break, the valves must operate to prevent a serious loss of air pressure in the remainder of the system. In systems of this kind it is necessary to protect either one of two adjacent reservoirs from serious loss by means of a valve or valves in the main line and my double action type of pressure limiting valve serves this purpose since it protects the line and pressure reservoirs for either direction of undue drop in pressure through the valve. When, as a result of an accident, one of the valves thus placed has been operated and the break in the line has been repaired, the by-pass valve mechanism contained in the main valve casing operates to quickly restore the two sides of the main valve to the same pressure so that the automatic valve mechanism is returned to its open position under the action of the controlling spring of the valve. In the branch pipes leading from the main pipes in a system of the kind under consideration, it is necessary to have protection only in one direction and thus single acting valves constructed in accordance with my invention are sufficient to afford this result. Both the single acting and double acting valves, however, are similarly made in many respects which, as far as I am aware, are novel.

The several drawings illustrating my invention are as follows:

Figure 1 shows in central longitudinal section my valve construction;

Fig. 2 is a transverse central section of the valve casing shown in Fig. 1 showing the mounting in the casing of the by-pass valve mechanism;

Fig. 3 shows a pipe line and pressure tanks equipped with valves of the construction herein described.

Similar numerals refer to similar parts throughout the several views.

As shown in Fig. 1, the valve casing 1 is provided with an inlet opening 2 and an outlet opening 3 which communicate through an apertured horizontal wall 4 in the body of the valve, which wall has threaded into its aperture a valve seat 5. The valve seat is adapted to coöperate with a valve 6 which has extending axially from its rear surface a cylindrical spider 7 for guiding the valve 6 by engagement with the tubular bushing 8 rigidly secured in a tubular flange 9 projecting into the valve casing from the cover 10 of the valve. The cover 10 is threaded to receive a threaded stem 11 operated by means of a hand wheel 12 so that its inner mounted end enters the cylindrical spider 7 to engage the rear face of the valve 6 to hold it in place upon its seat when desired. The stem 11 outside of the threaded portion where it passes through the cover 10 is packed in a manner well known in the art, as a result of which it is not here particularly described.

The valve 6 has projecting axially from its front face through the aperture in the valve seat 5, a stem 13 terminating in an enlarged disk or head 14 against the under face of which one end of a spring 15 rests. The central portion of the disk 14 is conformed to engage the inside of the upper coil of the spring 15 to prevent lateral displacement of the spring relatively to the same. The lower end of the spring 15 rests upon a plate 16, also provided with a cylindrical extension to prevent lateral displacement of the spring 15.

The joint between the valve cap or cover 10 and the body portion 1 is made perfectly tight by means of an annular flange 23 of V-shaped cross-section, which extends from the under face of the cover, said flange being grooved as indicated so that when it is forced into engagement with the V-shaped groove formed in the outer face of the valve casing 1 to receive it, the reduced rings thus formed on the flange 23 yield so as to make a perfectly tight joint with the body portion 1. Similar joints are formed on the end flanges 24 and 25 of the valve casing so as to make tight joints with the section of pipe to which the valve mechanism is connected.

The plate 16 is engaged on its outer face by an adjusting screw 17 which extends through the end wall 33 formed across the lower end of the tubular extension 34 formed on the valve 32, which valve coöperates with the lower end of the valve seat 5. The valve 32, tubular extension 34 and end wall 33 thus together constitute both a valve for interrupting communication between the two passages of the valve body 1 and the receptacle for the spring 15 and its coöperating parts. The outer face of the valve 32 rests against the inner end of the screw plug 35 which is bored so as to form a loose fit for the tubular extension 34. The inner wall of the screw plug 35 is provided with grooves 36 to secure restricted communication between the passage 3 and the compartment formed within the screw cover 37 which is screwed on to the screw plug 35 to surround and protect the adjusting screw 17. The screw plug 35 is screwed into the valve casing 1 so as to hold the spring 15 in line with the valve stem 13 and the operating stem. Holes 38 are drilled through the disk 14 to provide a desired degree of communication between the passage 3 and the inside of the tubular extension 34. The valve 6 is preferably provided with a vent passage 21 and the valve casing 1 is preferably provided with an auxiliary by-pass valve 26 as shown in Fig. 2.

The operation of the mechanism is as follows: When the pressure in the passage 3 drops below the pressure in the passage 2 by an amount slightly in excess of that for which the spring 15 is set, the pressure on the rear or outer face of the valve 6 causes the valve to move into engagement with its seat against the action of the spring 15. For this operation, the holes 38 afford a sufficient relief for the air contained in the tubular extension 34 so that the desired cushioning effect is secured. When for any reason the pressure in the passage 2 drops below the pressure in the passage 3 by an amount somewhat in excess of that for which the spring 15 is set, the fluid in the cap 37, having at the instant an excess pressure over the pressure in the passage 2, moves the valve 32 upwardly as shown in Fig. 1 against the action of the spring 15, for which operation the holes 38 afford a suitable relief to the fluid contained in the tubular extension 34 so that the closing of the valve 32 will take place effectively and yet not too violently. As the valve 32 moves toward its seat 5 it will be understood that the difference between the pressures in the passages 2 and 3 is increased and that therefore, when the valve is brought into contact with its seat it is securely held there by the pressure in the passage 3. When the valve 6 is against its seat 5, it may be held in closed position by means of the operating stem 11. When the cause for the difference in pressure has been removed and it is desired to open the valve 6, since the pressure in the passage 3 is still sufficiently below that in the passage 2 to hold the valve 6 in its closed position, it is necessary to provide a means for equalizing the pressure in the passages 2 and 3. This may be accomplished by means of the vent passage 21 which is opened immediately upon screwing back the operating stem from engagement with the valve 6. For this position of the operating stem, pressure in the passage 2 finds its way through the vent 21 and the lateral opening 22 and the pressure in the passage 3 is gradually built up so that it nearly equals the pressure in the passage 2 and as soon as the difference between these pressures is within the value for which the spring 15 is set, the spring serves to open the valve 6 and permits free communication between the passages 2 and 3.

For certain conditions of operation it is found that a more rapid equalization of pressure between the passages 2 and 3 is required than is possible through the vent passage 21. To meet this condition, an auxiliary valve mechanism is mounted in the valve casing 1 as shown in Fig. 2 consisting in a valve 26 coöperating with a valve seat 27 so that when closed, communication is interrupted between the ports 28 and 29 leading through the valve casing to the passages 2 and 3 respectively. The valve 26 is connected with an operating stem 30 by means of which it may be raised or lowered by the hand wheel 31 to afford communication between the ports 28 and 29 which are located below and above the valve seat 27 respectively, or to interrupt such communication as desired. As a result, when the valve casing 1 is equipped with this auxiliary valve mechanism and it is desired to equalize the pressures in the passages 2 and 3, the hand wheel 31 is operated to raise the valve 26 to establish communication between the ports 28 and 29, for which condition in a very short time the pressure is built up in the passage 3 to a point sufficiently near the pressure in the passage 2 so that the valve 6 is opened by the spring 15. The valve 26 is held in closed position against the seat 27 by means of the operating stem 30 during the normal operation of the rest of the valve mechanism.

In Fig. 3 I have shown somewhat diagrammatically a pressure system such as is sometimes used for operating tools in mines by means of compressed air in which valves of the kind described above are particularly effective. In this figure the supply pipe 39 forming a part of the main pipe line connects with a storage reservoir 40 and also through a valve 1ª with the reservoir 41. Between the storage reservoir 40 and the valve 1ª a branch pipe 42 is connected, which is provided with a pressure limiting valve 1. The valve 1ª is preferably of the construction shown and described in connection with Fig. 1 while the valve 1 may be similar, but of the single acting type since the branch pipe 42 does not normally serve to supply the permanent reservoir with air under pressure. On the other hand, the reservoirs 40 and 41 are frequently of considerable capacity so that it is very desirable to prevent undue loss from either one in the event of injury to the other one or to the piping immediately adjacent to it. Any injury that might occur to the branch pipe 42 outside of the pressure limiting valve 1 is taken care of by the valve 1 of the single acting type and protection in either direction in the main pipe line 39 is secured by a valve of the double acting type as indicated at 1ª. It would, of course, be evident that as many of the valves 1ª may be employed in the main line 39 as is desired in order that the system may be amply protected.

While I have shown my invention in the particular embodiments herein described and shown, I do not limit myself to these constructions, but desire to claim any equivalents that may suggest themselves to those skilled in the art.

What I claim is:

1. In a valve construction, the combination of a housing having an aperture extending through it, a valve seat located in said aperture, a valve coöperating with said seat to control the flow of fluid through said aperture, a stem extending from said valve transversely of the main direction of said aperture, a spring engaging said stem and tending to hold the valve away from its seat, a screw for changing the tension on said spring, a second valve seat disposed in the housing in opposite relation to the first valve seat, a bushing surrounding said spring and having a second valve formed on its inner end for engaging said second valve seat, said bushing being slidably mounted in the housing and serving to support said screw, there being restricted passageways from the said aperture along the sides of said bushing to its outer end, and a cap inclosing the outer end of said bushing and screw.

2. In a valve construction, the combination of a housing having an aperture extending through it, a valve seat located in said aperture, a valve coöperating with said seat to control the flow of fluid through said aperture, a stem extending from said valve transversely of the main direction of said aperture, a spring engaging said stem and tending to hold the valve away from its seat, a screw for changing the tension on said spring, a second valve seat disposed in the housing in opposite relation to the first valve seat, a bushing surrounding said spring and having a second valve formed on its inner end for engaging said second valve seat, said bushing being slidably mounted in the housing and serving to support said screw, there being restricted passageways from the said aperture along the sides of said bushing to its outer end, and a cap inclosing the outer end of said bushing and screw, said bushing being mounted in a plug threaded into said housing.

3. In a valve construction, the combination of a housing having an aperture extending through it, a valve seat located in said aperture, a valve coöperating with said seat to control the flow of fluid through said aperture, a stem extending from said valve transversely of the main direction of said aperture, a spring engaging said stem and tending to hold the valve away from its seat, a screw for changing the tension on said spring, a second valve seat disposed in the housing in opposite relation to the first valve seat, a bushing surrounding said spring and having a second valve formed on its inner end for engaging said second valve seat, said bushing being slidably mounted in the housing and serving to support said screw, there being restricted passageways from the said aperture along the sides of said bushing to its outer end, a cap inclosing the outer end of said bushing and screw, and a threaded valve stem for holding the first named valve against its seat.

4. In a valve construction, the combination of a housing having an aperture extending through it, a valve seat located in said aperture, a valve coöperating with said seat to control the flow of fluid through said aperture, a stem extending from said valve transversely of the main direction of said aperture, a spring engaging said stem and tending to hold the valve away from its seat, a screw for changing the tension on said spring, a second valve seat disposed in the housing in opposite relation to the first valve seat, a bushing surrounding said spring and having a second valve formed on its inner end for engaging said second valve seat, said bushing being slidably mounted in the housing and serving to support said screw, there being restricted passageways from the said aperture along the sides of said bushing to its outer end, and a cap inclosing the outer end of said bushing and screw, there being an aperture of small bore communicating with opposite sides of one of said valve seats.

5. In a valve, the combination of a casing having a passage permitting the flow therethrough of fluid under pressure, two valve seats in said passage, two valves, one for engaging each seat, whereby one valve checks the flow in one direction and the other valve checks the flow in the opposite direction through said passage, a stem extending from one side of one of said valves, a tubular extension projecting from the other valve in the same direction as said stem, and a spring in said tubular extension engaging said extension and said stem, said casing having a bore for containing said tubular extension.

6. In a valve, the combination of a casing having a passage permitting the flow therethrough of fluid under pressure, two valve seats in said passage, two valves, one for engaging each seat, whereby one valve checks the flow in one direction and the other valve checks the flow in the opposite direction through said passage, a stem extending from one side of one of said valves, a tubular extension projecting from the other valve in the same direction as said stem, and a spring in said tubular extension engaging said extension and said stem, said casing having a bore for containing said tubular extension and forming a receptacle for fluid under pressure around the outer end of said tubular extension.

7. In a valve, the combination of a casing having a passage permitting the flow therethrough of fluid under pressure, two valve seats in said passage, two valves, one for engaging each seat, whereby one valve checks the flow in one direction and the other valve checks the flow in the opposite direction through said passage, a stem extending from one side of one of said valves, a tubular extension projecting from the other valve in the same direction as said stem, a spring in said tubular extension engaging said extension and said stem, said casing having a bore for containing said tubular extension, and a screw through the outer end of said tubular extension for changing the tension of said spring.

8. In a valve, the combination of a casing having a passage permitting the flow therethrough of fluid under pressure, two valve seats in said passage, two valves, one for engaging each seat, whereby one valve checks the flow in one direction and the other valve checks the flow in the opposite direction through said passage, a stem extending from one side of one of said valves, a tubular extension projecting from the other valve in the same direction as said stem, a spring in said tubular extension engaging said extension and said stem, said casing having a bore for containing said tubular extension, and a disk on the outer end of said stem loosely fitting said tubular extension.

9. In a valve, the combination of a casing having a passage permitting the flow therethrough of fluid under pressure, two valve seats in said passage, two valves, one for engaging each seat, whereby one valve checks the flow in one direction and the other valve checks the flow in the opposite direction through said passage, a stem extending from one side of one of said valves, a tubular extension projecting from the other valve in the same direction as said stem, a spring in said tubular extension engaging said extension and said stem, said casing having a bore for containing said tubular extension, and devices for positively holding one of said valves against its seat.

10. In a valve, the combination of a casing having a passage permitting the flow therethrough of fluid under pressure, two valve seats in said passage, two valves, one for engaging each seat, whereby one valve checks the flow in one direction and the other valve checks the flow in the opposite direction through said passage, a stem extending from one side of one of said valves, a tubular extension projecting from the other valve in the same direction as said stem, a spring in said tubular extension engaging said extension and said stem, said casing having a bore for containing said tubular extension, and a threaded rod for engaging the other side of said first valve to positively hold it against its seat.

11. In a valve, the combination of a casing having a passage permitting the flow therethrough of fluid under pressure, two valve seats in said passage, two valves, one for engaging each seat, whereby one valve checks the flow in one direction and the other valve checks the flow in the opposite direction through said passage, a stem extending from one side of one of said valves, a tubular extension projecting from the other valve in the same direction as said stem, a spring in said tubular extension engaging said extension and said stem, said casing having a bore for containing said tubular extension, and a threaded rod for engaging the other side of said first valve to positively hold it against its seat, said first valve having a vent therethrough closed by said rod when it engages said valve.

12. In a valve, the combination of a casing having a passage permitting the flow therethrough of fluid under pressure, two valve seats in said passage, two valves, one for engaging each seat, whereby one valve checks the flow in one direction and the other valve checks the flow in the opposite direction through said passage, a stem extending from one side of one of said valves, a tubular extension projecting from the other valve in the same direction as said stem, and a spring in said tubular extension engaging said extension and said stem, said casing having a bore for containing said tubular extension and forming a receptacle for fluid under pressure around the outer end of said tubular extension, there being restricted passageways along the outer wall of said tubular extension between said receptacle and the passage through said casing.

In witness whereof, I hereunto subscribe my name this 14th day of October, A. D., 1912.

OLAF E. OLESON.

Witnesses:
ALBERT C. BELL,
CLIFFORD C. DE WEES.